United States Patent
Berry

(10) Patent No.: US 9,301,610 B1
(45) Date of Patent: Apr. 5, 2016

(54) ENCLOSED BOLTLESS SHELVING SYSTEM

(71) Applicant: Christopher H. Berry, Trabuco Canyon, CA (US)

(72) Inventor: Christopher H. Berry, Trabuco Canyon, CA (US)

(*) Notice: Subject to any disclaimer, the term of this patent is extended or adjusted under 35 U.S.C. 154(b) by 0 days.

(21) Appl. No.: 14/616,914

(22) Filed: Feb. 9, 2015

(51) Int. Cl.
*A47B 57/34* (2006.01)
*A47B 96/14* (2006.01)

(52) U.S. Cl.
CPC ............. *A47B 96/1416* (2013.01); *A47B 57/34* (2013.01)

(58) Field of Classification Search
CPC ............... A47B 47/00; A47B 47/0025; A47B 47/0033; A47B 47/0041; A47B 47/005; A47B 47/0083; A47B 47/02; A47B 47/021; A47B 47/028; A47B 57/00; A47B 57/06; A47B 57/08; A47B 57/10; A47B 57/16; A47B 57/20; A47B 57/22; A47B 57/30; A47B 57/32; A47B 57/34; A47B 57/48; A47B 57/50; A47B 96/1416
USPC .................. 211/26, 187; 312/265.5
See application file for complete search history.

(56) References Cited

U.S. PATENT DOCUMENTS

| | | | | |
|---|---|---|---|---|
| 1,975,613 A | * | 10/1934 | Nystrom et al. | 52/280 |
| 2,058,263 A | * | 10/1936 | Rosendale | 312/265.4 |
| 3,862,691 A | * | 1/1975 | Mori et al. | 211/191 |
| 4,064,995 A | * | 12/1977 | Bustos | 211/187 |
| 4,351,244 A | * | 9/1982 | Suttles | 108/107 |
| 4,513,669 A | * | 4/1985 | Steinke | 108/107 |
| 4,645,276 A | * | 2/1987 | Flavigny | 312/257.1 |
| 4,742,782 A | * | 5/1988 | Miller | 108/107 |
| 4,949,648 A | * | 8/1990 | Miller | 108/107 |
| 4,967,916 A | * | 11/1990 | Handler et al. | 211/187 |
| 5,553,549 A | * | 9/1996 | Nilsson | 108/110 |
| 6,238,029 B1 | * | 5/2001 | Marzec et al. | 312/265.3 |
| 8,196,758 B2 | * | 6/2012 | Lee | 211/26 |
| 8,632,272 B2 | * | 1/2014 | Wojtowicz et al. | 403/300 |
| 8,672,150 B2 | * | 3/2014 | Chen et al. | 211/187 |
| 2002/0195410 A1 | * | 12/2002 | Lin | 211/190 |
| 2005/0103733 A1 | * | 5/2005 | Saltzberg et al. | 211/187 |
| 2005/0103734 A1 | * | 5/2005 | Saltzberg et al. | 211/187 |
| 2011/0272373 A1 | * | 11/2011 | Wojtowicz et al. | 211/134 |
| 2011/0272542 A1 | * | 11/2011 | Wojtowicz et al. | 248/218.4 |
| 2012/0000872 A1 | * | 1/2012 | Troyner et al. | 211/150 |

FOREIGN PATENT DOCUMENTS

| | | | | |
|---|---|---|---|---|
| DE | 4023685 | * | 7/1990 | A47B 57/40 |
| WO | WO 9319642 A1 | * | 10/1993 | A47B 57/50 |

* cited by examiner

*Primary Examiner* — Joshua Rodden
(74) *Attorney, Agent, or Firm* — Morland C. Fischer

(57) ABSTRACT

An easy-to-assemble, easy-to-break down boltless shelving system including a rack and shelves on which articles can be stored and displayed. The boltless shelving system has upstanding corner posts located at the four corners of the rack by which back and side panels can be slidably and removably attached to the rack to enclose three sides thereof. Each upstanding corner post of the rack has a pair of flat faces that extend from one another at an angle. The outer ends of the flat faces are bent to form longitudinally-extending flanges that run along opposite sides of each of the corner posts. The flanges have a generally L-shaped profile to create guide channels. Panels are pushed downwardly and into receipt by the guide channels of opposite facing flanges of a pair of adjacent corner posts, whereby to enclose the rack of the shelving system on any number of sides thereof.

3 Claims, 5 Drawing Sheets

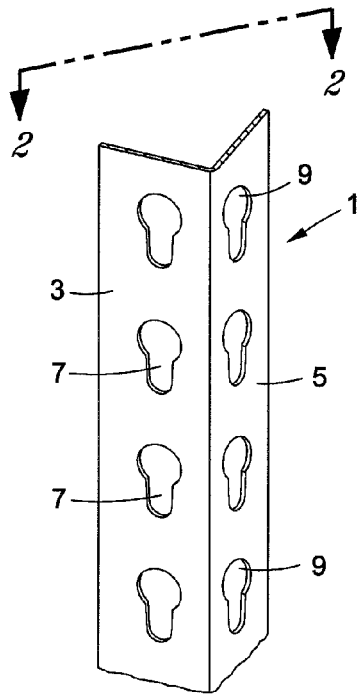
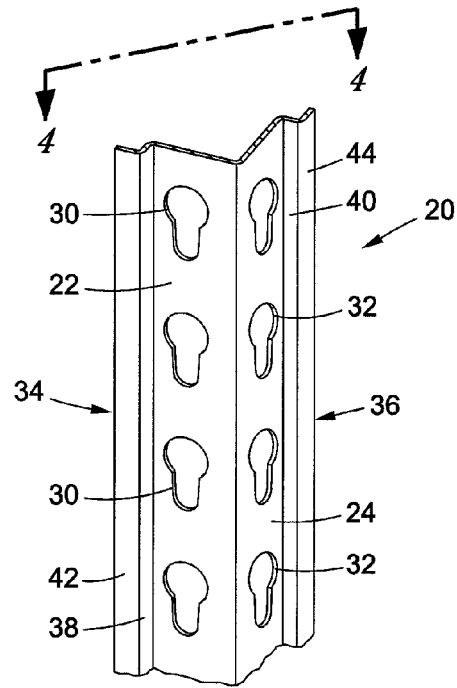
Fig. 1
(PRIOR ART)
Fig. 3
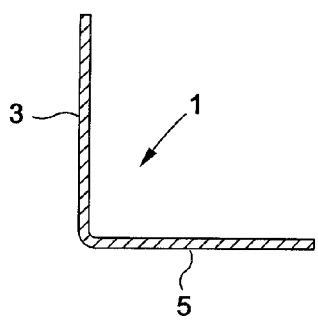
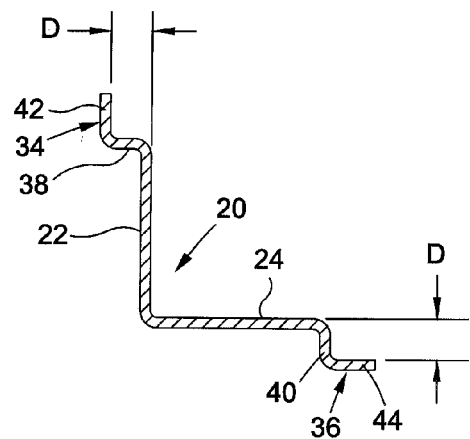
Fig. 2
(PRIOR ART)
Fig. 4

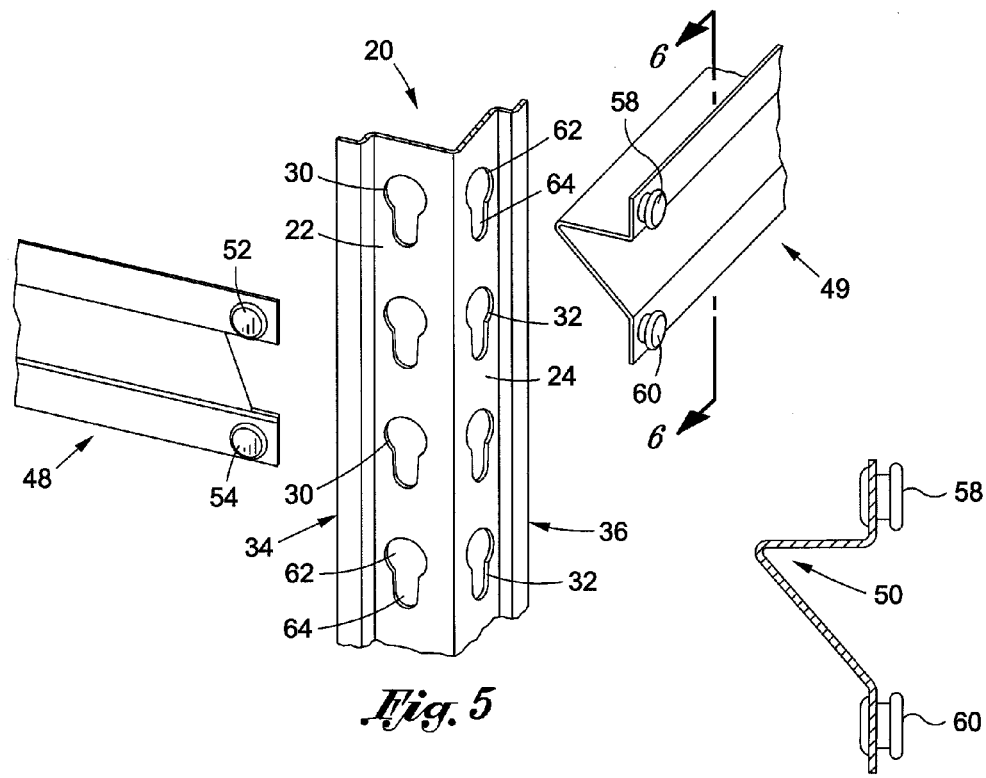
Fig. 5
Fig. 6
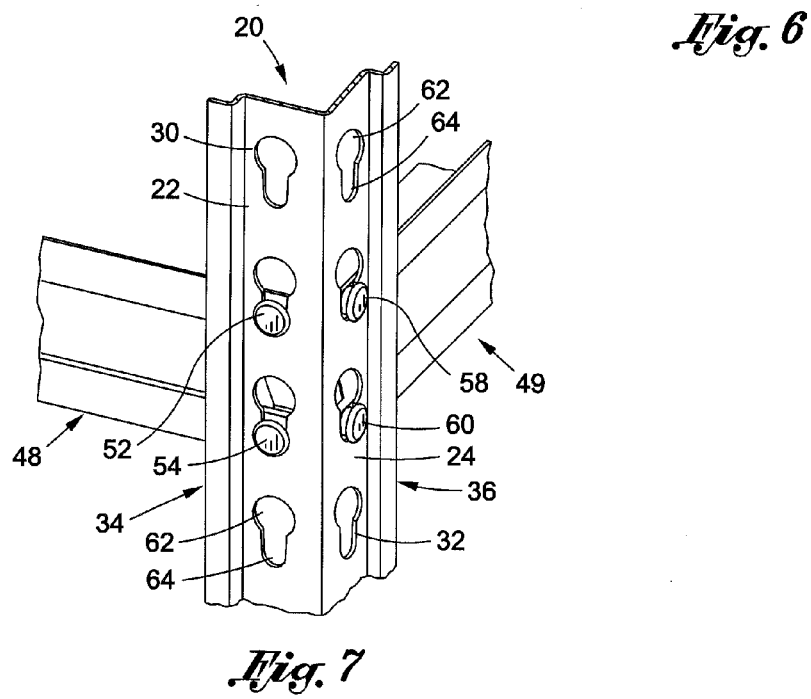
Fig. 7

ENCLOSED BOLTLESS SHELVING SYSTEM

BACKGROUND OF THE INVENTION

1. Field of the Invention

This invention relates to an easy-to-assemble, easy-to-break down boltless shelving system which, when assembled, includes a sturdy rack on which to store books, files, decorative items, and the like. The boltless shelving system has unique corner posts to which back and side panels are removably attached to permit the rack to be quickly and easily enclosed on any number of sides.

2. Background Art

Shelving systems are known by which metal racks are created on which a variety of articles can be placed for storage and/or display. The typical shelving system includes a set of four corner posts which stand vertically upright. Shelf support braces are connected horizontally between adjacent pairs of corner posts. The shelf support braces surround the rack so that flat shelves can be laid thereon.

Referring in this regard to FIGS. 1 and 2 of the drawings, a conventional corner post 1 is shown of the kind used with the typical shelving system. The corner post 1 has a pair of continuously flat faces 3 and 5 that are aligned perpendicular to one another. A first plurality of keyholes 7 are formed through a first of the pair of faces 3 of the post 1, and a second plurality of keyholes 9 are formed through the second face 5. The keyholes are dimensioned to receive and capture respective rivet heads (not shown) which project from opposite ends of each shelf support brace (also not shown) to enable the shelf support brace to be connected between a pair of the upstanding corner posts 1. A metal rack that is assembled by means of the upstanding corner post 1 of FIGS. 1 and 2 includes a total of four of such corner posts and at least four shelf support braces that are coupled to adjacent pairs of corner posts so as to extend horizontally therebetween. The interconnection of the shelf support braces to the corner posts 1 creates an open, free-standing rack having one or more flat shelves spaced one above the other.

Once it has been created, it may be desirable to enclose the open rack on three sides with back and/or side panels. Such an enclosure is usually formed by mounting dense fiberboard panels, or the like, against the rack. The foregoing is often accomplished by first drilling bolt holes in the panels and then bolting the panels to the back and sides of the rack. This technique of enclosure is time-consuming, requires the use of tools and bolts, and complicates the overall assembly process. What would therefore be desirable is a boltless shelving system which includes an open rack that can be quickly and easily assembled and enclosed on three sides by back and side panels without having to use tools and bolts and without the complexity associated with the assembly and enclosure of a typical shelving system.

SUMMARY OF THE INVENTION

In general terms, disclosed herein is an easy-to-assemble and easy-to-break down boltless shelving system having a storage rack which can be enclosed on any number of sides without the use of tools or fasteners. The foregoing is accomplished by means of unique vertically-extending corner posts which are interconnected with sets of vertical shelf support braces to create an open, free-standing (e.g., metal) rack for holding a plurality of shelves on which a variety of articles (e.g., books, files, decorative items, and the like) can be laid and stored.

Each corner post of the boltless shelving system includes a pair of flat faces that extend from one another at an angle, such that the faces ideally lie perpendicular to one another. A set of spaced axial-aligned keyholes is formed in each of the angled flat faces of the corner post. The outer ends of the flat faces are bent to form longitudinally-extending flanges which run along opposite sides of the corner post. Each flange includes a track and an outside edge that are arranged with one another to have a generally L-shaped profile by which to create a guide channel within which to slidably and removably receive one side of a back or a side panel.

More particularly, four of the vertically-extending corner posts and sets of four horizontally-extending shelf support braces are interconnected to create the open rack by locating a pair of rivet heads that project from each end of a shelf support brace through a corresponding pair of keyholes formed in each of the flat faces of each of the corner posts. The opposite sides of a back panel are then pushed downwardly through the guide channels of respective longitudinally-extending flanges of a pair of adjacent corner posts located at the rear of the rack. The opposite sides of a side panel are pushed downwardly through the guide channels of respective longitudinally-extending flanges of a pair of adjacent corner posts located at each side of the rack. Accordingly, the rear and sides of the rack of the boltless shelving system are quickly and easily enclosed.

BRIEF DESCRIPTION OF THE DRAWINGS

FIG. 1 shows a conventional corner post of the kind used in the assembly of a typical shelving system;

FIG. 2 is a top view of the conventional corner post taken along lines 2-2 of FIG. 1;

FIG. 3 shows a modified corner post for use in the assembly of a boltless shelving system according to a preferred embodiment of the present invention;

FIG. 4 shows a top view of the modified corner post taken along lines 4-4 of FIG. 3;

FIG. 5 shows a pair of shelf support braces to be detachably connected to respective faces of the modified corner post of FIGS. 3 and 4;

FIG. 6 is a cross-section of one of the pair of shelf support braces taken along lines 6-6 of FIG. 5;

FIG. 7 shows the pair of shelf support braces of FIG. 5 detachably connected to the modified corner post by means of locating rivet heads which project from the shelf support braces within respective keyholes formed in a pair of faces of the modified corner post;

DESCRIPTION OF THE PREFERRED EMBODIMENT

Figure 11:
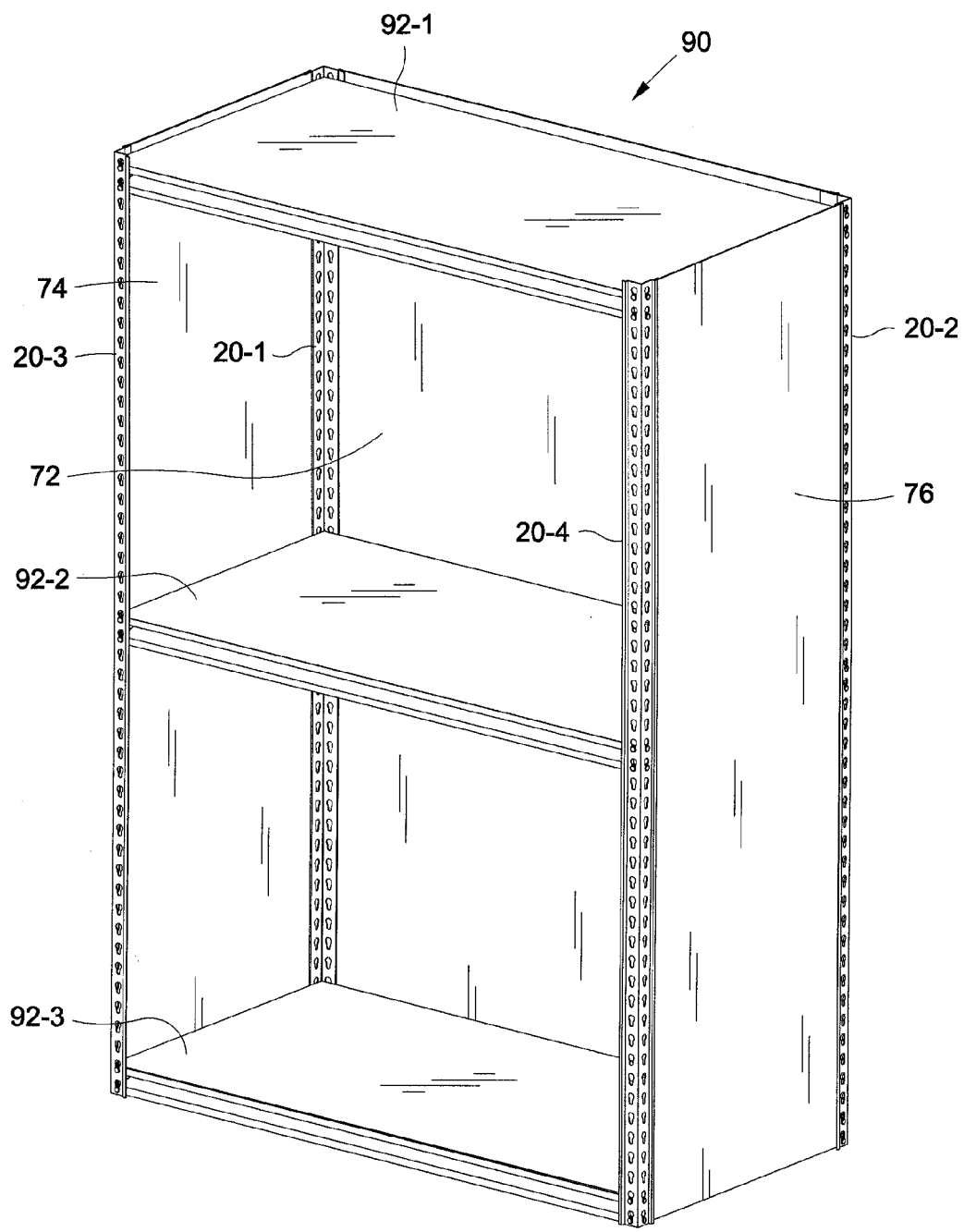
FIG. 11 is a perspective view of a fully assembled boltless shelving system according to the preferred embodiment of this invention including the enclosed rack of FIG. 9.

Turning initially to FIGS. 3 and 4 of the drawings, there is shown a preferred embodiment for an upright corner post 20 to be used with a plurality of (e.g., three) other upright corner posts to create an easy-to-assemble and easy-to-break down, enclosed boltless shelving system (designated 90 and best shown in FIG. 11). The corner post 20 is modified so as to provide advantageous benefits relative to the conventional corner post (designated 1 and described above while referring to FIGS. 1 and 2). The modified corner post 20 includes a pair of flat angled faces 22 and 24 that ideally lie perpendicular to one another. A first set of keyholes 30 are arranged in spaced axial alignment through a first 22 of the pair of flat faces of the modified corner post 20. A second set of keyholes 32 are arranged in spaced axial alignment through the second flat face 24 of the modified corner post 20.

As an important detail of the modified corner post 20, longitudinally-extending flanges 34 and 36, which are integral to and depend from the pair of flat angled faces 22 and 24, run along opposite sides of the corner post 20. The flanges 34 and 36 are formed by applying bending forces, or the like, to the flat faces 22 and 24. More particularly, each of the flat faces 22 and 24 is bent so as to form out-turned tracks 38 and 40. The out-turned tracks 38 and 40 are then bent to form outside edges 42 and 44. The out-turned tracks 38 and 40 lie in approximate perpendicular alignment with the outside edges 42 and 44, such that each of the longitudinally-extending flanges 34 and 36 has a generally L-shaped profile.

The outside edges 42 and 44 of the L-shaped flanges 34 and 36 are spaced outwardly from the pair of flat faces 22 and 24 of the corner post 20 by means of the out-turned tracks 38 and 40 lying therebetween. By way of example only, each outside edge 42 and 44 is separated from its flat face 22 and 24 by a space (designated D in FIG. 4) of about 5 mm. As will be explained in greater detail hereinafter, the L-shaped flanges 34 and 36 having the outside edges 42 and 44 spaced from respective ones of the flat faces 22 and 24 (by the distance D) provide the modified post 20 with a pair of guide channels (best shown in FIGS. 9 and 10) within which to receive respective sides of a back or a side panel.

FIGS. 5-7 of the drawings show a pair of standard, horizontally-extending shelf support braces 48 and 49 being detachably connected to respective ones of the pair of flat angled faces 22 and 24 of the modified corner post 20 of FIGS. 3 and 4 when the corner post stands vertically upright. Typically, one or more sets of four horizontally-extending shelf support braces 48, 49, 50 and 51 are coupled to and surround a set of four upright corner posts 20-1, 20-2, 20-3 and 20-4 to create an open storage rack (designated 70 in FIG. 8). In the case of FIGS. 5-7, a pair of such support braces 48 and 49 are shown coupled to a single modified corner post 20. The shelf support braces 48 and 49 and the corner post 20 are preferably manufactured from steel or any other suitable structurally-sound material.

Each support brace 48 and 49 has a pair of upper and lower rivet heads 52, 54 and 58, 60 projecting from the opposite ends thereof (with only one end of the braces 48 and 49 being shown). As previously explained while referring to FIG. 3, a first set of spaced, axially-aligned keyholes 30 are formed through a first flat face 22 of corner post 20, and a second set of spaced, axially-aligned keyholes 32 are formed through the other flat face 24 of corner post 20. Each keyhole 30 and 32 from the sets thereof has a well-known tear-drop shape with a relatively wide entrance opening 62 at the top and a relatively narrow drop slot 64 at the bottom. The pairs of upper and lower rivet heads 52, 54 and 58, 60 from support braces 48 and 49 are removably attached to respective pairs of axially-aligned keyholes 30 and 32 by first inserting the rivet heads into entrance openings 62 and then forcing the rivet heads downwardly (by means of a mallet or similar impact tool striking the support braces) so as to slide through and be captured by drop slots 64 (best shown in FIG. 7). The shelf support braces 48 and 49 may be disconnected and separated from the modified corner post 20 by reversing the just-completed attachment steps in the event it is desirable to disassemble the storage rack 70 (of FIG. 8).

Figure 9:
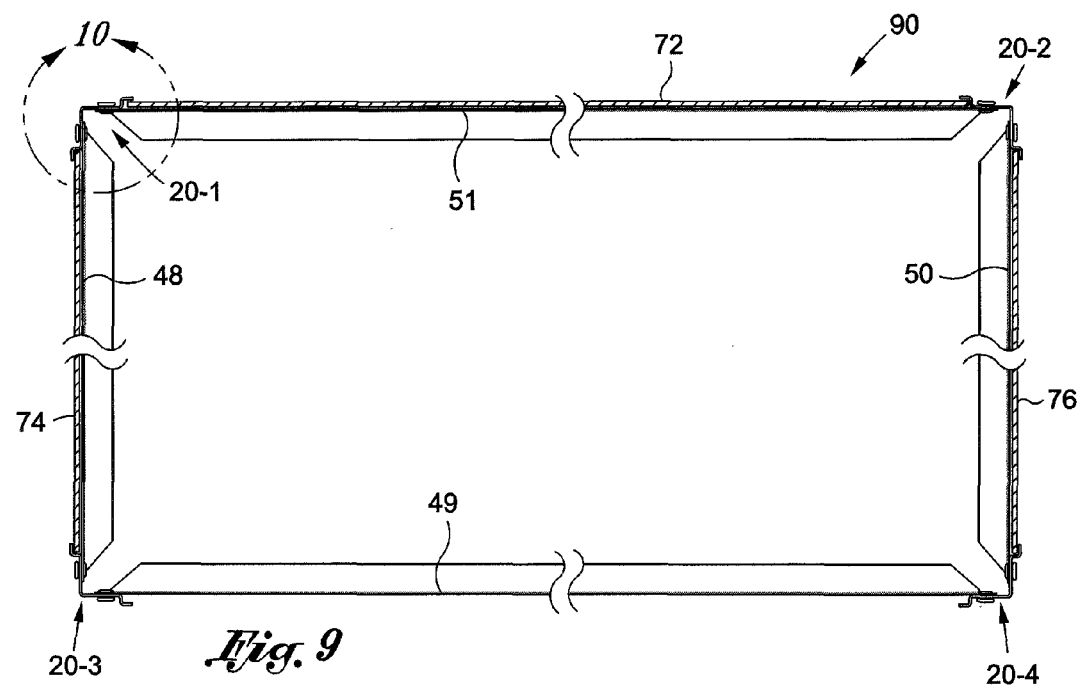
FIG. 9 is a top view of the rack shown in FIG. 8 after back and side panels have been slidably connected to the four modified corner posts in order to enclose the rack on three sides thereof.

Turning now to FIG. 9 of the drawings, an open, free-standing metal rack 70 is shown following the connection (in the manner described while referring to FIGS. 5-7) of sets of four horizontal shelf support braces 48-51 to four modified corner posts 20-1, 20-2, 20-3 and 20-4 which stand vertically upright at the corners of rack 70. Each of the modified corner posts 20-1 . . . 20-4 is identical to the modified corner post 20 that was earlier described, and each shelf support brace extends between a pair of adjacent corner posts. The number and the location of the sets of shelf support braces relative to the corner posts of the rack 70 are variable according to the function and size of the rack and, therefore, are not to be considered as a limitation of this invention.

As was previously disclosed when referring above to FIGS. 3 and 4, each of the modified corner posts 20-1 . . . 20-4 of the open rack 70 has a pair of flanges 34 and 36 extending longitudinally along the opposite sides thereof, whereby to establish guide channels for the receipt of respective opposite sides of a back or a side panel. Being able to quickly and easily attach such back and side panels to the open rack 70 would be particularly advantageous in order to enclose the rack on three sides for containment and/or aesthetic purposes.

Figure 8:
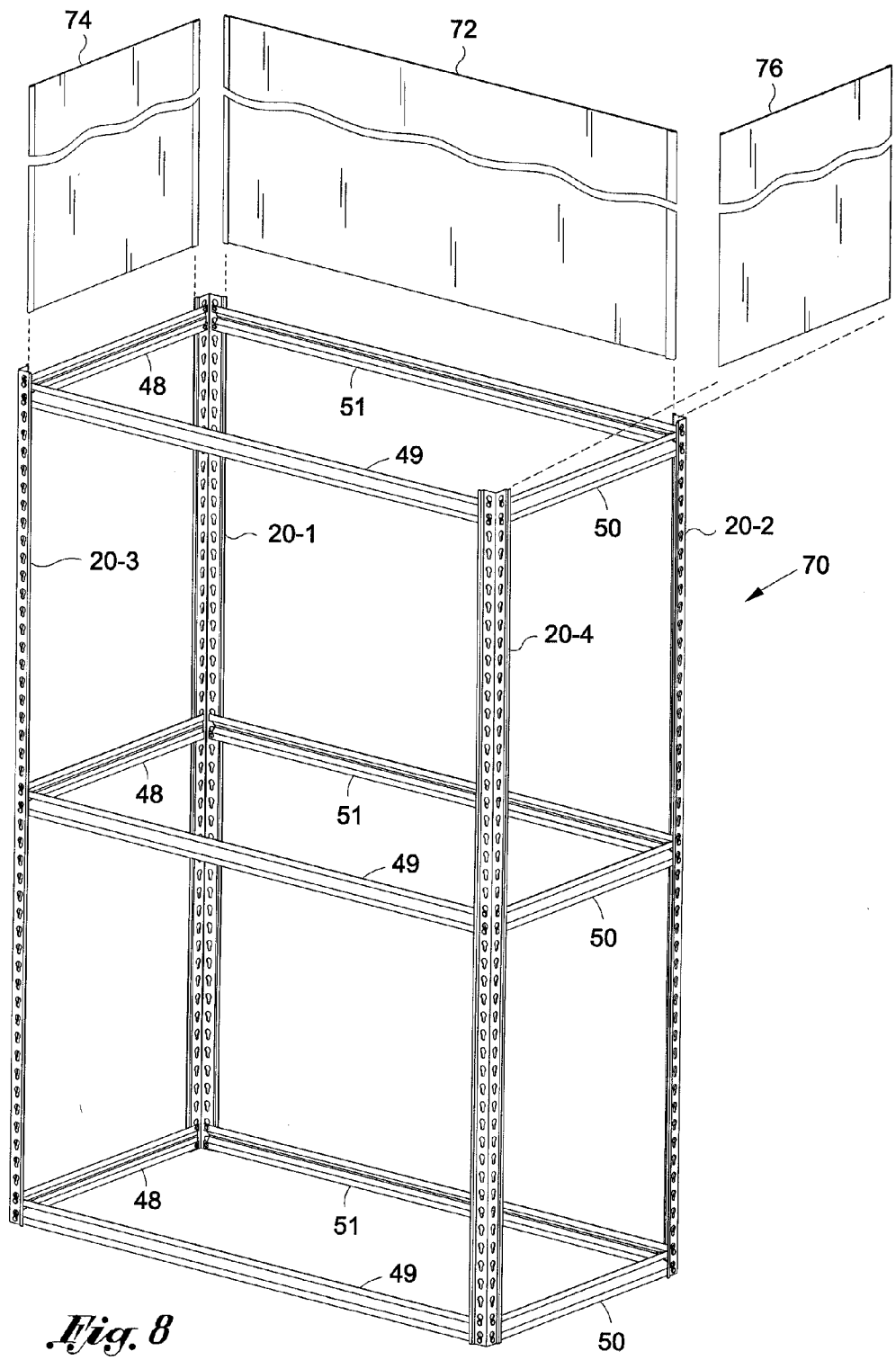
FIG. 8 shows an open rack that is created once a plurality of shelf support braces are connected to four of the modified corner posts.
Figure 10:
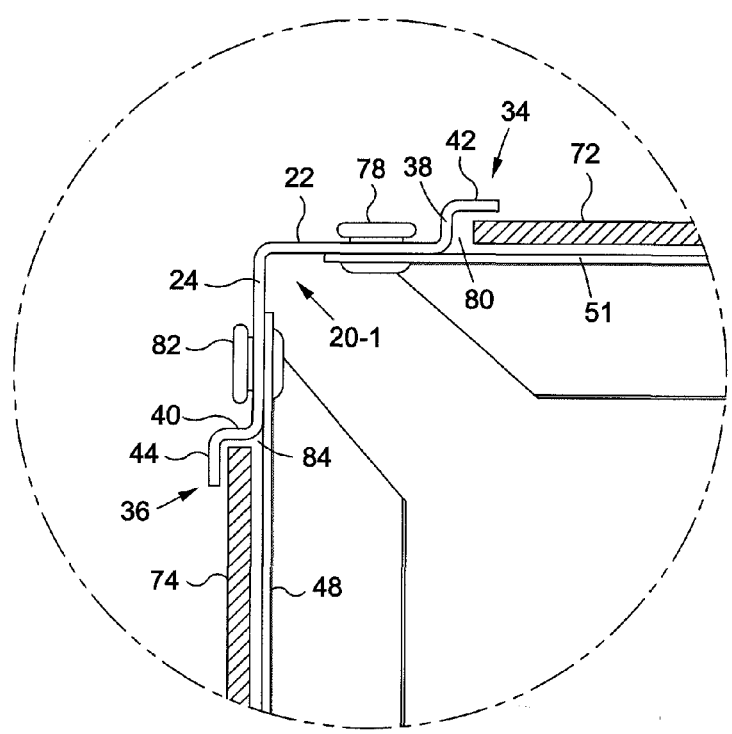
FIG. 10 is an enlarged detail of one corner of the enclosed rack taken from FIG. 9.

Referring concurrently in this regard to FIGS. 8-10 of the drawings, a back panel 72 and a pair of side panels 74 and 76 are shown of the kind that are suitable to be attached to the open rack 70. The panels 72, 74 and 76 are preferably flat sheets that can be manufactured from a variety of materials including, but not limited to, wood, particle or fiber board, corrugated cardboard, steel, wire mesh, etc. The panels 72, 74 and 76 can have a plain finish or a decorative finish to enhance the aesthetic appeal of the rack 70 after being enclosed on three sides thereof to complete a fully-assembled shelving system.

As is best shown in FIGS. 9 and 10, the outside edge 42 of the flange 34 that runs longitudinally along one side of the upstanding corner post 20-1 that is located at one corner of the rack 70 of FIG. 9 is spaced behind the shelf support brace 51 that runs horizontally across the rear of rack 70. As earlier explained, one end of the shelf support brace 51 is detachably connected to the flat face 22 of the modified corner post 20-1 by means of a pair of rivet heads (only one of which 78 being shown in FIG. 10).

Accordingly, a gap 80 is created between the outside edge 42 of the flange 34 and the shelf support brace 51. The track 38 and the outside edge 42 of flange 34 thusly form a guide channel with support brace 51 through which one side of the back panel 72 can be pushed so as to slide downwardly therethrough (best shown in FIG. 10). The outside edge 42 of the flange 34 of the corner post 20-1 cooperates with the outside edge of an opposing flange of the adjacent corner post (designated 20-2 in FIG. 9) so as to hold the back panel 72 in place at the rear of the rack 70 during enclosure. The back panel 72 can be removed by being pulled and sliding upwardly through the guide channel formed by flange 34 in the event it is desired to break down the rack following assembly and enclosure.

Likewise, the outside edge 44 of the flange 36 that runs longitudinally along the other side of the upstanding corner post 20-1 is spaced from the shelf support brace 48 that runs horizontally across one side of the rack 70. One end of the shelf support brace 48 is detachably connected to the flat face 24 of the corner post 20-1 by means of a pair of rivet heads (only one of which 82 being shown in FIG. 10). Accordingly, a gap 84 is created between the outside edge 44 of the flange 36 and the shelf support brace 48. The track 40 and the outside edge 44 of flange 36 thusly form a guide channel with support brace 48 through which one side of the side panel 74 can be pushed so as to slide downwardly therethrough (also best shown in FIG. 10). The outside edge 44 of the flange 36 of the corner post 20-1 cooperates with the outside edge of an opposing flange of the adjacent corner post (designated 20-3 in FIG. 9) so as to hold the side panel 74 in place at the side of the rack during enclosure. The side panel 74 can be removed by being pulled and sliding upwardly through the guide channel formed by flange 36 in the event it is desired to break down the rack following assembly and enclosure.

The side panel 76 is slidably and removably connected between the adjacent modified corner posts 20-3 and 20-4 of the rack 70 at respective flanges thereof in the same manner in which the side panel 74 is slidably and removably connected between corner posts 20-1 and 20-3. Thus, and as is best shown in FIG. 11 of the drawings, the rack 70 of FIG. 8 is enclosed on three sides by the side panels 74 and 76 which lie in opposite facing alignment and the back panel 72 which lies between the side panels. A boltless shelving system 90 is completed when a plurality of shelves 92-1, 92-2 and 92-3 are laid upon respective sets of four shelf support braces 48, 49, 50 and 51 which extend between respective adjacent pairs of the modified corner posts 20-1, 20-2, 20-3 and 20-4. It may be appreciated that the uppermost shelf 92-1 can form the top and the lowermost shelf can form the bottom of the enclosed boltless shelving system 90. Although the rack 70 is shown enclosed on only three sides, it is within the scope of this invention for the rack to be enclosed on less than three sides or on all four sides.

It may also be appreciated that the rack of the boltless shelving system 90 of FIG. 11 is enclosed (by means of the back and side panels 72, 74 and 76 and the top shelf 92-1) without the use of tools and fewer fasteners as is otherwise common to conventional shelving systems. In this same regard, the enclosed boltless shelving system 90 may be quickly and easily disassembled (i.e., broken down) also without the use of tools by sliding the back and side panels 72, 74 and 76 upwardly and out of their removable receipt by the flanges (e.g., designated 34 and 36 in FIGS. 3-5, 7 and 8) at opposite sides of each of the modified corner posts 20-1, 20-2, 20-3 and 20-4. By virtue of the foregoing, the enclosed boltless shelving system 90 herein described can be assembled and disassembled in less time and without the complexity that is usually associated with conventional systems.

The invention claimed is:

1. A storage rack assembly having a plurality of corners and comprising a plurality of vertically-upstanding corner posts located at respective ones of said plurality of corners, a set of shelf support braces interconnected with and extending horizontally between successive pairs of said plurality of vertically-upstanding corner posts, and a shelf seated upon and supported by said set of shelf support braces, each one of a pair of adjacent ones of the vertically-upstanding corner posts including first and second faces joined together at respective first sides thereof and extending away from one another so that an angle is formed therebetween, and wherein a flange extends longitudinally along each of said pair of adjacent ones of the vertically-upstanding corner posts at the opposite sides of each of said first and second faces thereof, each flange having a first flange portion which turns away from a respective one of said first and second faces of each of said pair of adjacent ones of the vertically-upstanding corner posts and a second flange portion which turns away from said first flange portion, such that said second flange portion is separated from the respective one of said first and second faces by said first flange portion, wherein the first and second flange portions of the flanges at the opposite sides of the first faces of each of said pair of adjacent ones of the vertically-upstanding corner posts and one of said set of shelf support braces which is interconnected with and extends horizontally between said pair of adjacent ones of the vertically-upstanding corner posts form respective longitudinally-extending guide channels, such that the longitudinally-extending guide channels of the pair of adjacent ones of the vertically-upstanding corner posts lie in opposite facing alignment, said storage rack assembly further comprising a closure panel to close at least one side of said storage rack assembly located between said pair of adjacent ones of the vertically-upstanding corner posts, wherein opposite sides of said closure panel are slidably received by respective ones of the opposite facing longitudinally-extending guide channels of said pair of adjacent ones of the vertically-upstanding corner posts.

2. The storage rack assembly recited in claim 1, wherein each of the opposite sides of the first and second faces of each of said pair of adjacent vertically-upstanding corner posts includes first and second bends so as to form said first and second flange portions of each flange extending longitudinally along each of said pair of adjacent ones of the vertically-upstanding corner posts.

3. The storage rack assembly recited in claim 2, wherein the first and second flange portions of each flange extending longitudinally along each of said pair of adjacent ones of the vertically-upstanding corner posts are aligned with one another so as to have a generally L-shaped configuration.

* * * * *